Sept. 3, 1940.    K. E. CANFIELD    2,213,383
DUAL WHEELED VEHICLE
Original Filed May 20, 1937    4 Sheets-Sheet 2
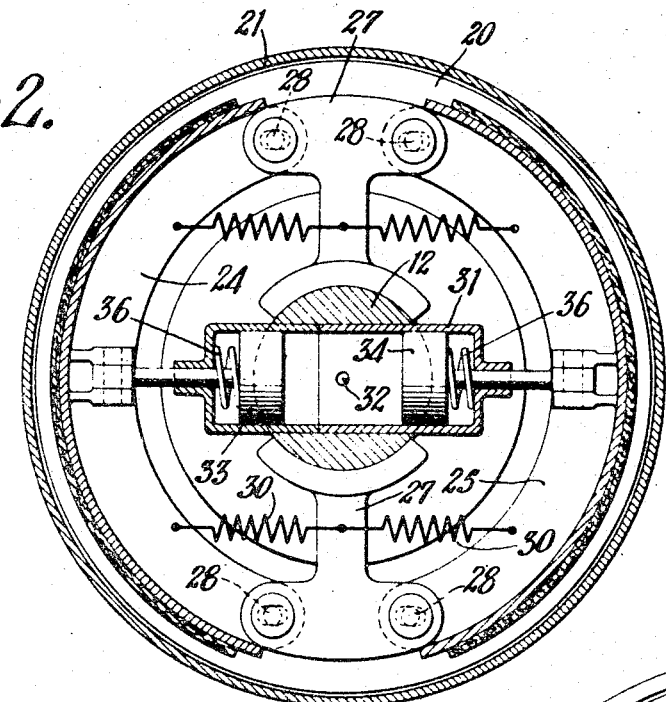
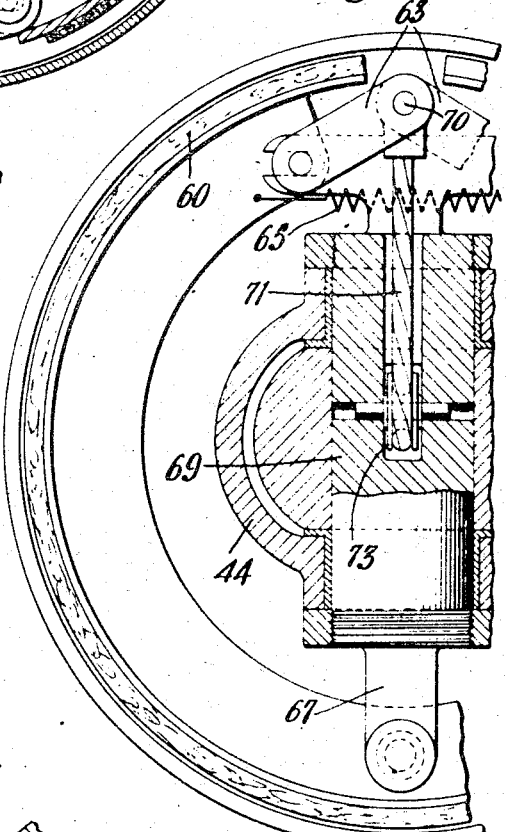
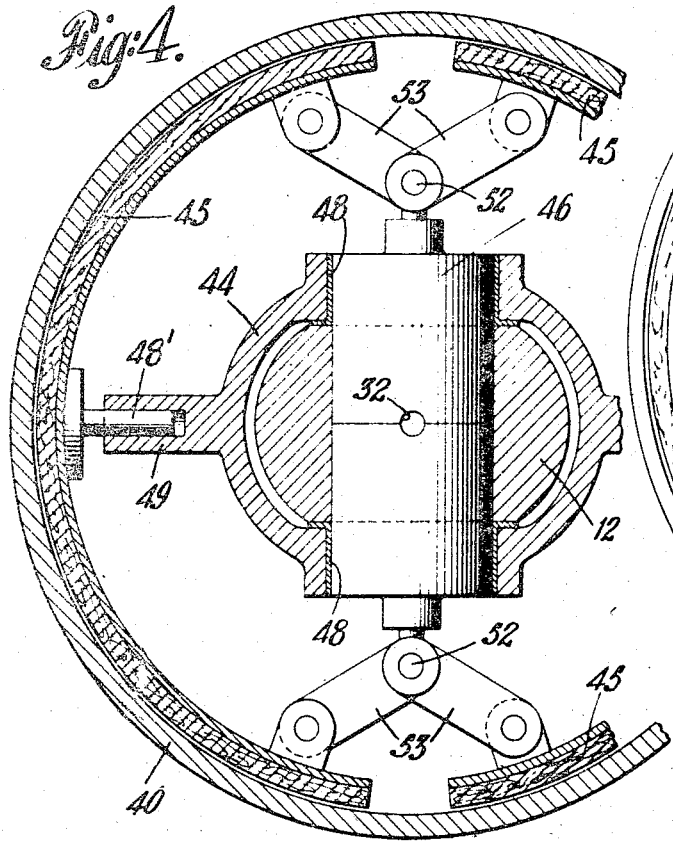
INVENTOR
K. E. Canfield
BY
Morgan Finnegan and Durham
ATTORNEY Sept. 3, 1940. K. E. CANFIELD 2,213,383
DUAL WHEELED VEHICLE
Original Filed May 20, 1937 4 Sheets-Sheet 3

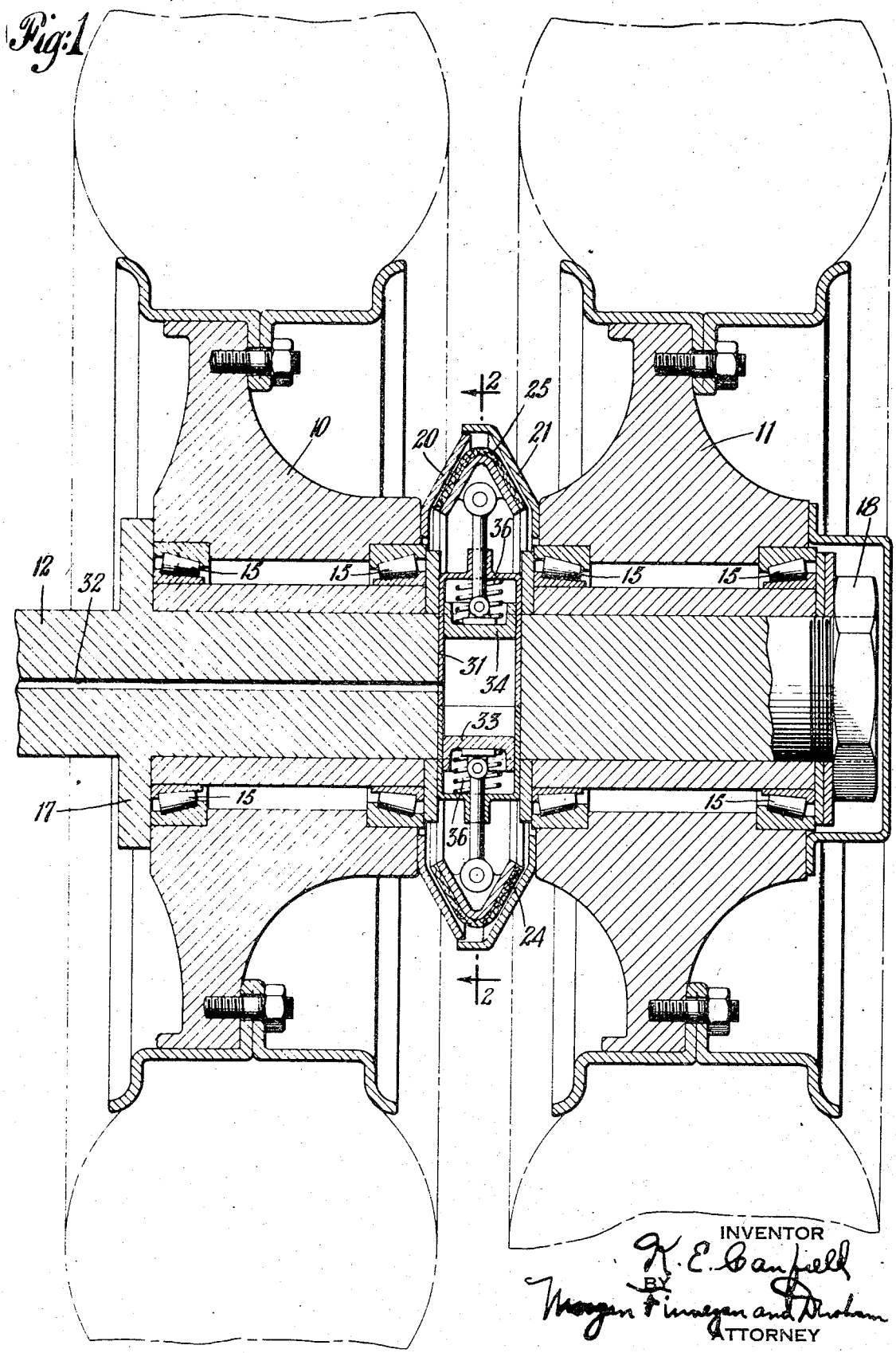

INVENTOR
K. E. Canfield
BY
Morgan Finnegan and Durham
ATTORNEYS

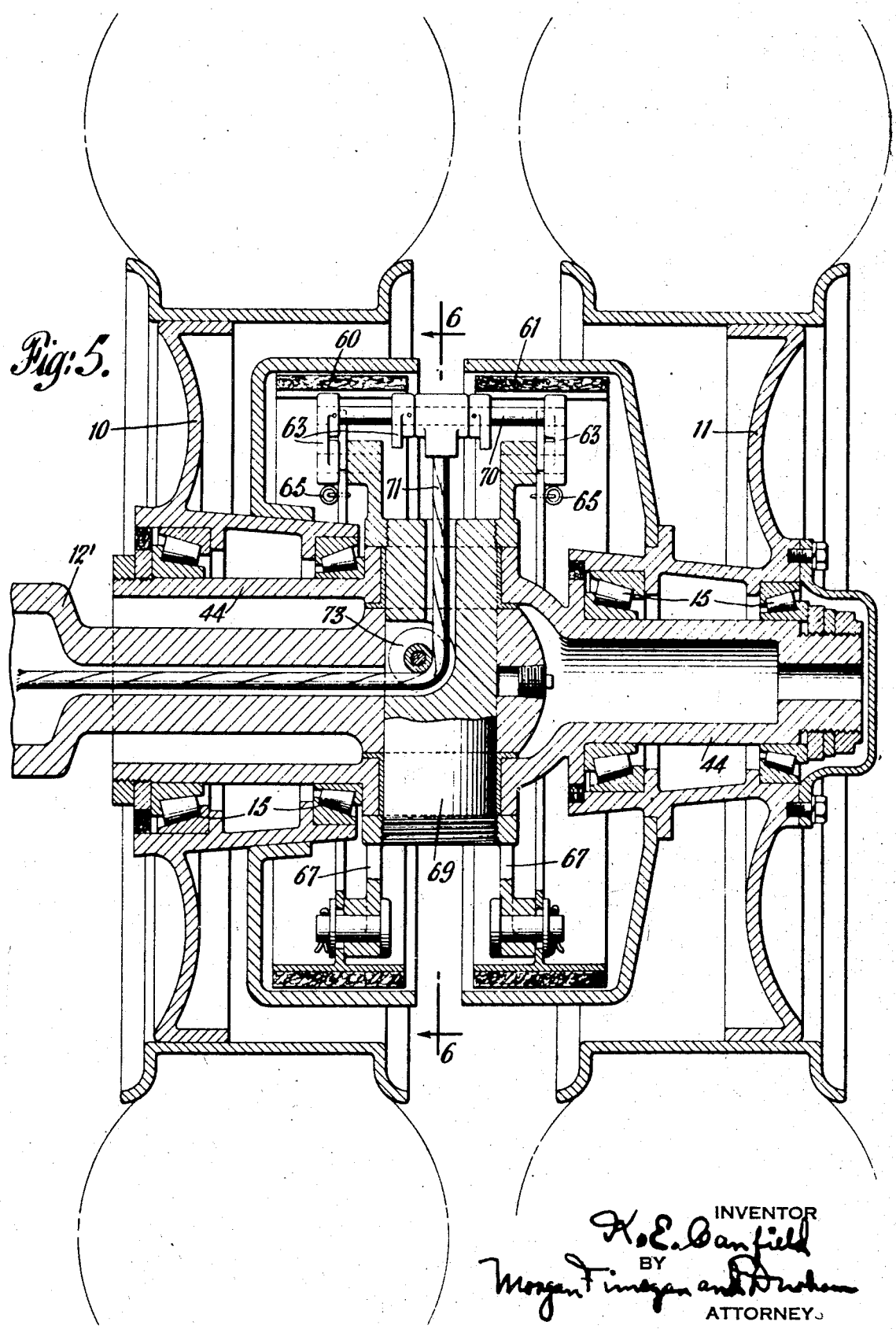

UNITED STATES PATENT OFFICE 2,213,383

DUAL WHEELED VEHICLE

Kendall E. Canfield, Manhasset, N. Y., assignor to Differential Wheel Corporation, a corporation of Delaware Application May 20, 1937, Serial No. 143,819
Renewed February 6, 1940

15 Claims. (Cl. 188—152)

The present invention relates to novel and useful improvements in dual wheeled structures and more particularly to improvements in the braking of dual wheels on automotive vehicles.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate embodiments of the invention, and together with the description, serve to explain the principles of the invention.

Of the drawings:

Fig. 1 is a horizontal section of a typical embodiment of the present invention;

Fig. 2 is a horizontal section taken on the line 2—2 of Fig. 1;

Fig. 4 is a horizontal section taken on the line 4—4 of Fig. 3;

Fig. 5 is a horizontal sectional view of a further modification of the present invention; and Fig. 6 is a horizontal section taken on the line 6—6 of Fig. 5.

Figure 3:
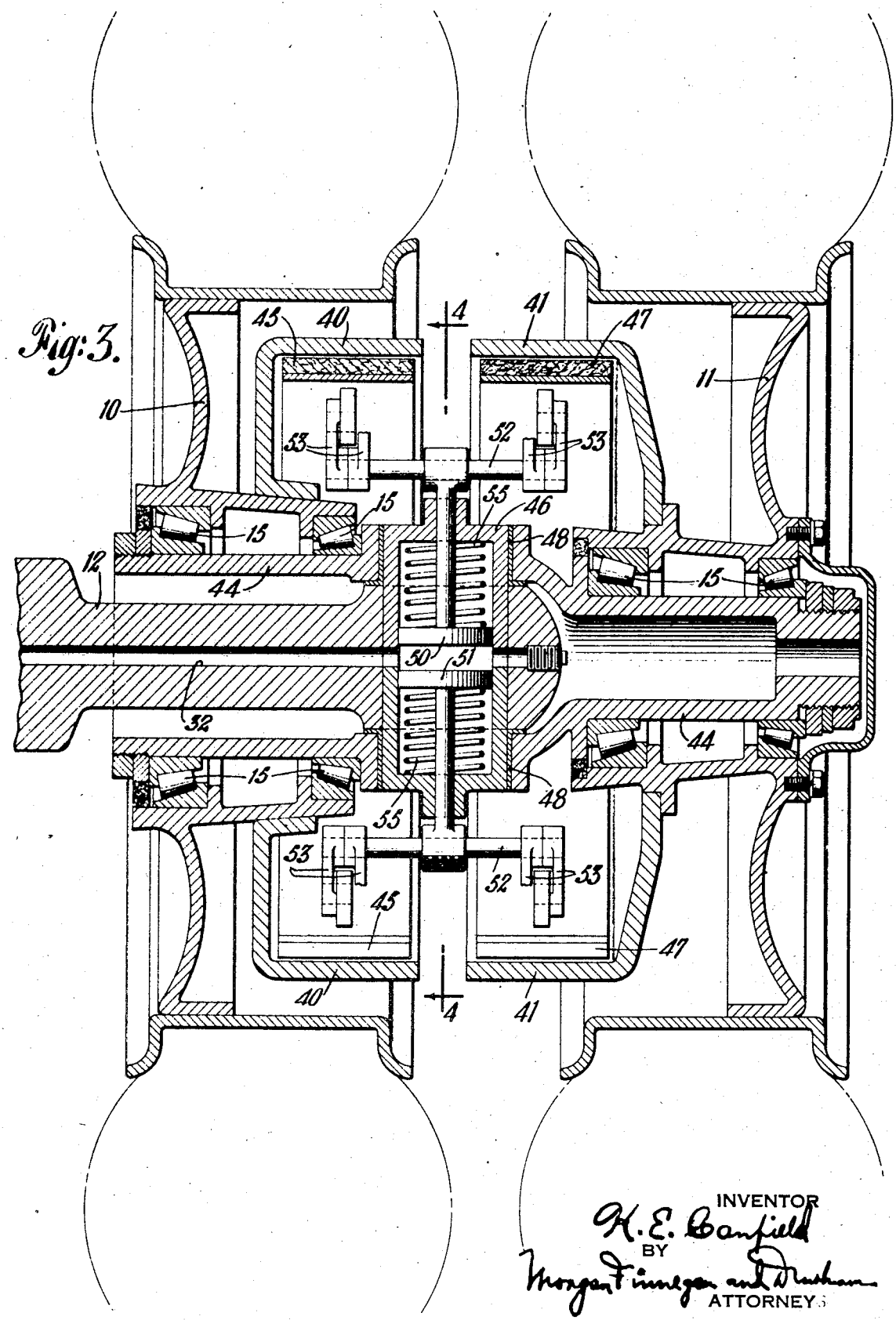
Fig. 3 is a horizontal section of a modified form of the present invention.

The present invention has for its object the provision of positive brakes for dual wheels which are independently rotatable, as well as the provision of braking means which may be simultaneously applied to both of the dual wheels even through they be independently rotatably mounted on their axle. A further object is the provision of separate braking means for each independently rotatable wheel of a dual wheeled vehicle. The invention also provides a brake for each of the independently rotatable wheels, the brake being mounted between the wheels. The invention is applicable to dual wheels rotating on a fixed axis, as well as to wheels which may move about a horizontal pivot axis in addition to their axis of rotation.

In certain respects, the invention is an improvement upon the structure disclosed in the patent to James F. Higbee, No. 1,976,068, but in other respects, the invention is capable of wider use and may be applied to the structure disclosed in the patent to Charles S. Ash, No. 1,979,598. In certain features, the invention may be applied to any dual wheeled structure having independently rotatable wheels.

In accordance with the illustrative structures here shown, the dual wheels are mounted for relative or independent rotation on an axle and may be used for the steering or propulsion of a motor vehicle or may be used as a dead axle as part of a "third axle" or trailing axle. As embodied, brake drums, one for each wheel, are mounted between the adjacent wheels and cooperate with brake members held against rotation and forced into operative or braking contact with the drums by operating mechanism also positioned between the wheels, which operating mechanism may be of the fluid, hydraulic or mechanical type. When the wheels are automatically cambering, that is, mounted for movement about a horizontal pivot so as always to remain perpendicular to the road, the braking mechanism or its moving parts are preferably mounted concentric with the horizontal pivot.

It will be understood that the foregoing general description and the following detailed description as well are exemplary and explanatory of the invention but are not restrictive thereof.

Referring now in detail to the illustrative embodiment of the invention as shown in Figures 1 and 2 of the accompanying drawings, there are provided two tired wheels 10 and 11 at each end of the axle 12 and these wheels are independently or relatively rotatable by means of suitable bearings 15, being retained on the axle by means of the shoulder 17 and nut 18.

Brake drums 20 and 21 between the wheels and attached to wheels 10 and 11 respectively are each of a generally frustro-conical shape and are adapted to cooperate with the brake shoes 24 and 25 which are mounted on the arms of spider 27 supported by and held against rotation by the axle 12. At their ends, brake shoes 24 and 25 are slotted to receive pins 28 by which they are supported on the spider arms. Springs 30 are connected between the spider arms and the brake shoes and normally serve to retract the brake into inoperative position.

Means are provided for forcing the brake shoes 24 and 25 into contact with the brake drums 20 and 21 for applying the brakes to stop the vehicle and as shown in Figures 1 and 2, hydraulic means are employed for this purpose. As embodied, a double-ended hydraulic cylinder 31 is provided within the brake mechanism and is adapted to communicate with the hydraulic brake fluid pipe which may be formed as a hole 32 drilled in the axle 12. Within cylinder 31 are contained the two pistons 33 and 34 flexibly connected to the shoes 24 and 25 and normally held in retracted position by means of the compression springs 36. For convenience in assembly, the cylinder 31 may be formed as two sections, joined along a transverse line. As pressure is applied through the fluid in pipe 33, the brake shoes are forced against the brake drums, and this application is equal as the brake shoes react against the two drums and the pressure on the brake drums is necessarily equal.

Figures 3 and 4 illustrate a modified form of the invention in which the brake shoes are hydraulically applied against conventional brake drums facing each other and fastened to their respective wheels. The dual wheels are shown as of the automatically compensating or cambering type and are arranged to remain always perpendicular to the surface of the road, thereby equally distributing the load between the two wheels. As embodied, brake drums 40 and 41 are rigidly mounted between the wheels 10 and 11 facing each other and fast on their respective wheels, while the wheels are independently rotatable and are oscillatable about a horizontal pivot. Thus the wheels 10 and 11 are independently rotatable on a skein 44 by means of the bearings 15 and the skein is mounted for limited oscillation in a vertical plane by means of the horizontal pivot pin 46 journalled in the bushings 48 seated in the skein 44. This construction is in certain respects generally similar to that shown in the patent to James F. Higbee, No. 1,976,068. Cooperating with the brake drums 40 and 41 are the brake shoes 45 and 47, which are each anchored on the skein 44 by means of the anchor pin 48' slidable in the apertured boss 49 formed integrally with the skein 44.

Means are provided for applying these brake shoes against their respective brake drums and the applying means are preferably concentric with the pivot pin 46. As embodied, pin 46 is hollow and forms a double-ended hydraulic pressure cylinder within which are movable the pistons 50 and 51 connected to the toggle pivot pins 52 connected at each of its ends with the toggle links 53 which serve to expand the brake shoes against the drums. The pressure exerted by the pistons is necessarily equal, and the pin 52, extending equally on both sides of the pivot 46 applies the brake shoes 45 and 47 equally. Due to the concentricity of the pistons 50 and 51 with the pivot pin 46, oscillation of the wheels about their horizontal pivot 46 does not vary the braking action, as the brake drums and shoes always remain symmetrical with respect to the pin 46.

Springs 55 serve to retain the brakes in normally released position, but are compressed in applying the brakes.

Figures 5 and 6 disclose a somewhat similar form of the invention except that the brakes are mechanically actuated. As shown the brake shoes 60 and 61 each comprise a single band adapted to be expanded by its toggle 63 and held in normally retracted position by the tension spring 65. A single anchor 67 is provided for each shoe, mounting it on the horizontal pivot pin 69.

Toggles 63 are expanded to actuate their brake shoes by means of the tie bar 70 which is adapted to be moved by cable 71 passing through a central aperture in the pivot pin 69 and passing over a pulley roller 73 so that the cable may extend through a tubular portion of the axle 12'.

The invention in its broader aspects is not limited to the specific mechanisms shown and described but departures may be made therefrom within the scope of the accompanying claims without departing from the principles of the invention and without sacrificing its chief advantages.

What I claim is:

1. In a dual wheeled structure having independently rotatable dual wheels on an axle, the combination of brake drums secured to each of the wheels, a fluid actuated braking member intermediate the wheels and engageable with both braking drums to brake the wheels.

2. In a dual wheeled structure having independently rotatable dual wheels on an axle, the combination of brake drums secured to each of the wheels, a cooperating braking member engageable with each of the drums and means for forcing the member into engagement with both drums, said means including a cylinder and piston intermediate the wheels and a fluid connection thereto within the axle.

3. In a dual wheeled structure for road vehicles having independently rotatable dual wheels mounted on an axle, the combination of horizontal pivot about which the wheels may move, brake drums secured to each of the wheels and means concentric with the pivot for applying a retarding force to each of the drums.

4. In a dual wheeled structure for road vehicles having independently rotatable dual wheels mounted on an axle, the combination of horizontal pivot about which the wheels may move, brake drums secured to each of the wheels and fluid pressure actuated means concentric with the pivot for applying a retarding force to each of the drums.

5. In a dual wheeled structure for road vehicles having independently rotatable dual wheels mounted on an axle, the combination of horizontal pivot about which the wheels may move, brake drums secured to each of the wheels and means concentric with the pivot for applying a retarding force to each of the drums, said means including brake shoes and means for uniformly applying the fluid pressure to each of the shoes.

6. In a dual wheeled structure for road vehicles having independently rotatable wheels mounted for rotational movement about an axle and for pivotal movement about a horizontal pivot point, the combination of brake drums secured to each of the wheels, a fluid pressure cylinder and piston concentric with the pivot, brake shoes held against rotation on the axle and means for operating the shoes by the piston.

7. In a dual wheeled structure for road vehicles having independently rotatable wheels mounted for rotational movement about an axle and for pivotal movement about a horizontal pivot point, the combination of brake drums secured to each of the wheels and adjacent to each other, brake shoes held against rotation on the axle and means concentric with the pivot for forcing the shoes against the drums.

8. In a dual wheeled structure for road vehicles having independently rotatable wheels mounted for rotational movement about an axle and for pivotal movement about a horizontal pivot point, the combination of brake drums secured to each of the wheels and adjacent to each other, brake shoes held against rotation on the axle and fluid pressure operated means concentric with the pivot for forcing the shoes against the drums.

9. In a dual wheeled structure for road vehicles having independently rotatable wheels mounted for rotational movement about an axle and for pivotal movement about a horizontal pivot point, the combination of brake drums secured to each of the wheels and adjacent to each other, brake shoes held against rotation on the axle and means concentric with the pivot for forcing the shoes against the drums, and equalizing means interconnecting the shoes and their operating means.

10. In a dual wheeled structure for road vehicles having independently rotatable wheels mounted for rotational movement about an axle and for pivotal movement about a horizontal pivot point, the combination of brake drums secured to each of the wheels and adjacent to each other, brake shoes held against rotation on the axle, fluid pressure operated means concentric with the pivot for forcing the shoes against the drums, and equalizing means interconnecting the shoes and their operating means.

11. In a dual wheeled structure for road vehicles having independently rotatable wheels mounted for rotational movement about an axle and for pivotal movement about a horizontal pivot point, the combination of brake drums secured to each of the wheels and adjacent to each other, brake shoes held against rotation on the axle and cable actuated means concentric with the pivot for forcing the shoes against the drums.

12. In a dual wheeled structure having independently rotatable dual wheels on one end of an axle, the combination of brake drums secured to each of the wheels, said drums being adjacent to each other and between the wheels and substantially closing the space between the adjacent dual wheels, brake shoes engageable with the drums and held against rotation on the axle, and means for engaging the shoes with the drums.

13. In a dual wheeled structure having independently rotatable dual wheels on one end of an axle, the combination of brake drums secured to each of the wheels, said drums being adjacent to each other and between the wheels, brake shoes engageable with the drums and brake applying means, said applying means including a connection for equalizing the force applied to the shoes against both drums.

14. In a dual wheeled structure having independently rotatable dual wheels on one end of an axle, the combination of brake drums secured to each of the wheels, said drums being adjacent to each other and between the wheels, one of said drums overlapping the other of said drums and providing a substantially closed space between the adjacent dual wheels, brake shoes within said closed space and engageable with the drums and held against rotation on the axle, and means for engaging the shoes with the drums.

15. In a dual wheeled structure having independently rotatable dual wheels on one end of an axle, the combination of brake drums secured to each of the wheels, said drums being adjacent to each other, of similar size and shape and positioned between the wheels, said drums extending towards each other and providing a substantially closed space, brake shoes engageable with the drums and held against rotation on the axle, and means for engaging the shoes with the drums.

KENDALL E. CANFIELD.